United States Patent
Martinez Romero

(10) Patent No.: US 10,214,146 B1
(45) Date of Patent: Feb. 26, 2019

(54) COLLISION AVOIDANCE ASSEMBLY

(71) Applicant: Mario A. Martinez Romero, Ocala, FL (US)

(72) Inventor: Mario A. Martinez Romero, Ocala, FL (US)

( * ) Notice: Subject to any disclaimer, the term of this patent is extended or adjusted under 35 U.S.C. 154(b) by 0 days.

(21) Appl. No.: 15/835,061

(22) Filed: Dec. 7, 2017

(51) Int. Cl.
*G08G 1/16* (2006.01)
*B60Q 9/00* (2006.01)
*B60R 11/00* (2006.01)

(52) U.S. Cl.
CPC .............. *B60Q 9/008* (2013.01); *B60R 11/00* (2013.01); *G08G 1/16* (2013.01); *B60R 2011/0005* (2013.01); *B60R 2011/0056* (2013.01); *B60Y 2400/902* (2013.01)

(58) Field of Classification Search
CPC ... G08G 1/16; B60Q 9/008; B60R 2300/8093
See application file for complete search history.

(56) References Cited

U.S. PATENT DOCUMENTS

| | | | |
|---|---|---|---|
| 5,433,691 A | 7/1995 | Hiraoka | |
| 7,245,231 B2 | 7/2007 | Kiefer et al. | |
| D556,194 S | 11/2007 | Rambosek et al. | |
| 7,551,103 B2* | 6/2009 | Schofield | B60Q 1/346 340/435 |
| 8,552,847 B1* | 10/2013 | Hill | G06F 3/016 340/407.1 |
| 9,000,903 B2 | 4/2015 | Bowers et al. | |
| 9,511,730 B1 | 12/2016 | Wu | |
| 9,539,944 B2 | 1/2017 | Tzirkel-Hancock et al. | |
| 2008/0174451 A1* | 7/2008 | Harrington | G08B 21/06 340/905 |
| 2016/0207454 A1* | 7/2016 | Cuddihy | B60Q 9/00 |
| 2016/0358453 A1* | 12/2016 | Wassef | G08B 25/016 |

FOREIGN PATENT DOCUMENTS

WO WO2005116956 12/2005

* cited by examiner

Primary Examiner — Phung Nguyen

(57) ABSTRACT

A collision avoidance assembly for alerting a driver to a collision hazard includes a controller and a plurality of sensors. The controller is configured to communicate wirelessly, to couple to a wrist of a driver of a first vehicle, and to selectively vibrate to alert the driver. The sensors are configured to couple to the first vehicle and are operationally coupled to the controller. The sensors are configured to selectively detect an object, such as a second vehicle and debris, proximate to the first vehicle and to communicate a warning to the controller. The controller is configured to vibrate to alert the driver to the object proximate to the first vehicle.

15 Claims, 4 Drawing Sheets

COLLISION AVOIDANCE ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to avoidance assemblies and more particularly pertains to a new avoidance assembly for alerting a driver to a collision hazard.

BRIEF SUMMARY OF THE INVENTION

An embodiment of the disclosure meets the needs presented above by generally comprising a controller and a plurality of sensors. The controller is configured to communicate wirelessly, to couple to a wrist of a driver of a first vehicle, and to selectively vibrate to alert the driver. The sensors are configured to couple to the first vehicle and are operationally coupled to the controller. The sensors are configured to selectively detect an object, such as a second vehicle and debris, proximate to the first vehicle and to communicate a warning to the controller. The controller is configured to vibrate to alert the driver to the object proximate to the first vehicle.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
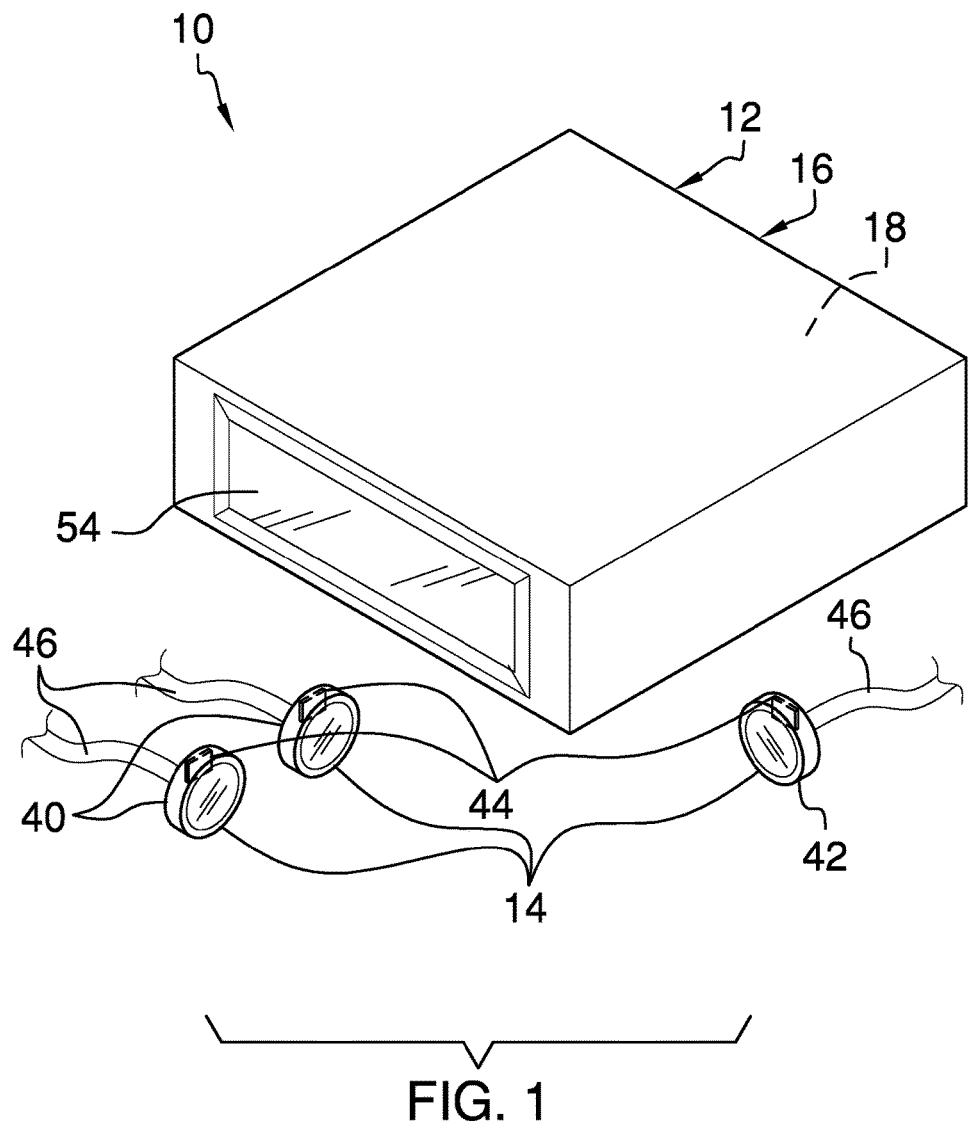
FIG. 1 is an isometric perspective view of a collision avoidance assembly according to an embodiment of the disclosure.
Figure 2:
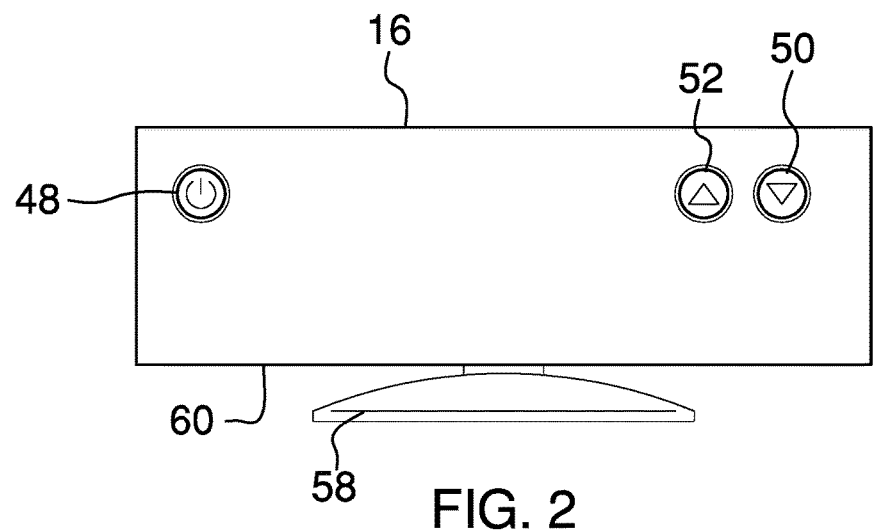
FIG. 2 is a side view of an embodiment of the disclosure.
Figure 3:
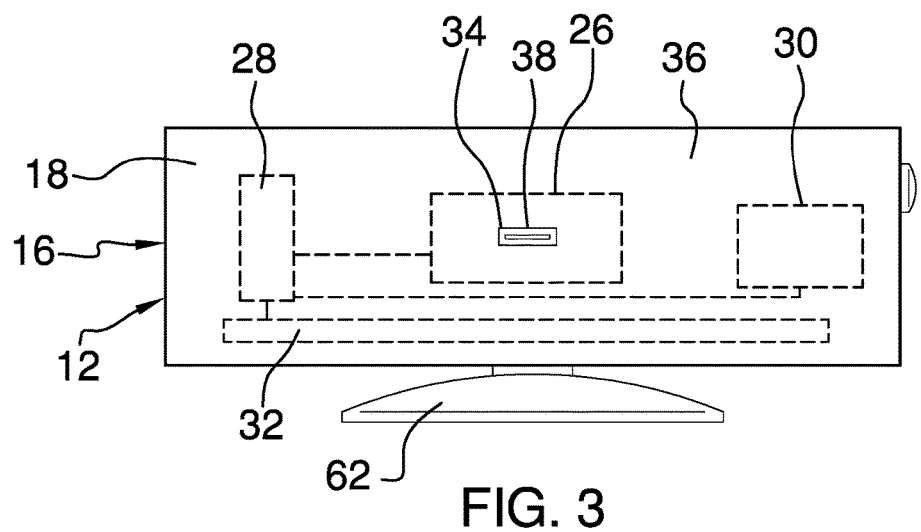
FIG. 3 is a back view of an embodiment of the disclosure.
Figure 4:
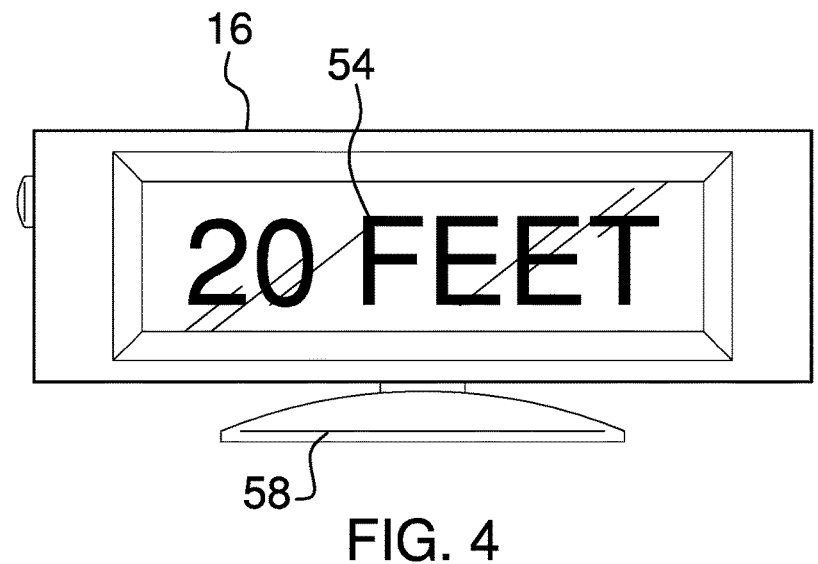
FIG. 4 is a front view of an embodiment of the disclosure.
Figure 5:
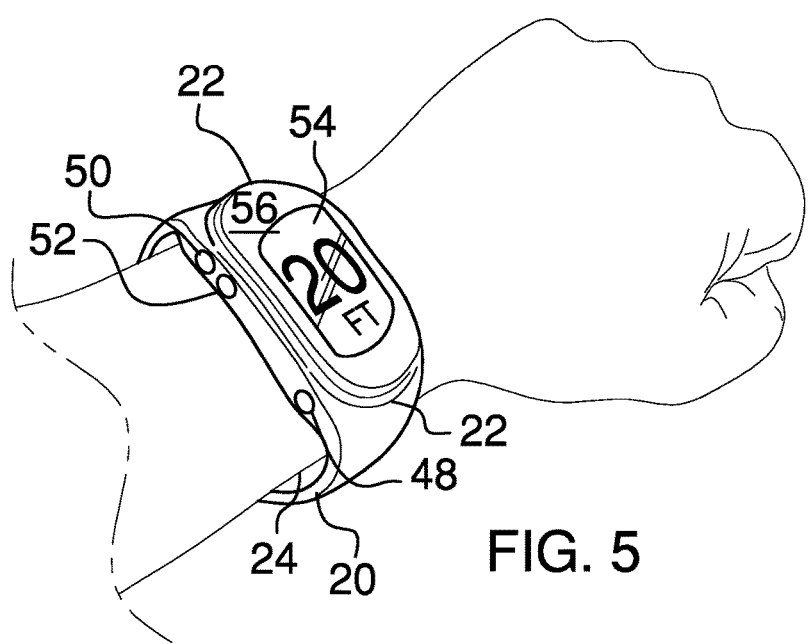
FIG. 5 is an isometric perspective view of an embodiment of the disclosure.
Figure 6:
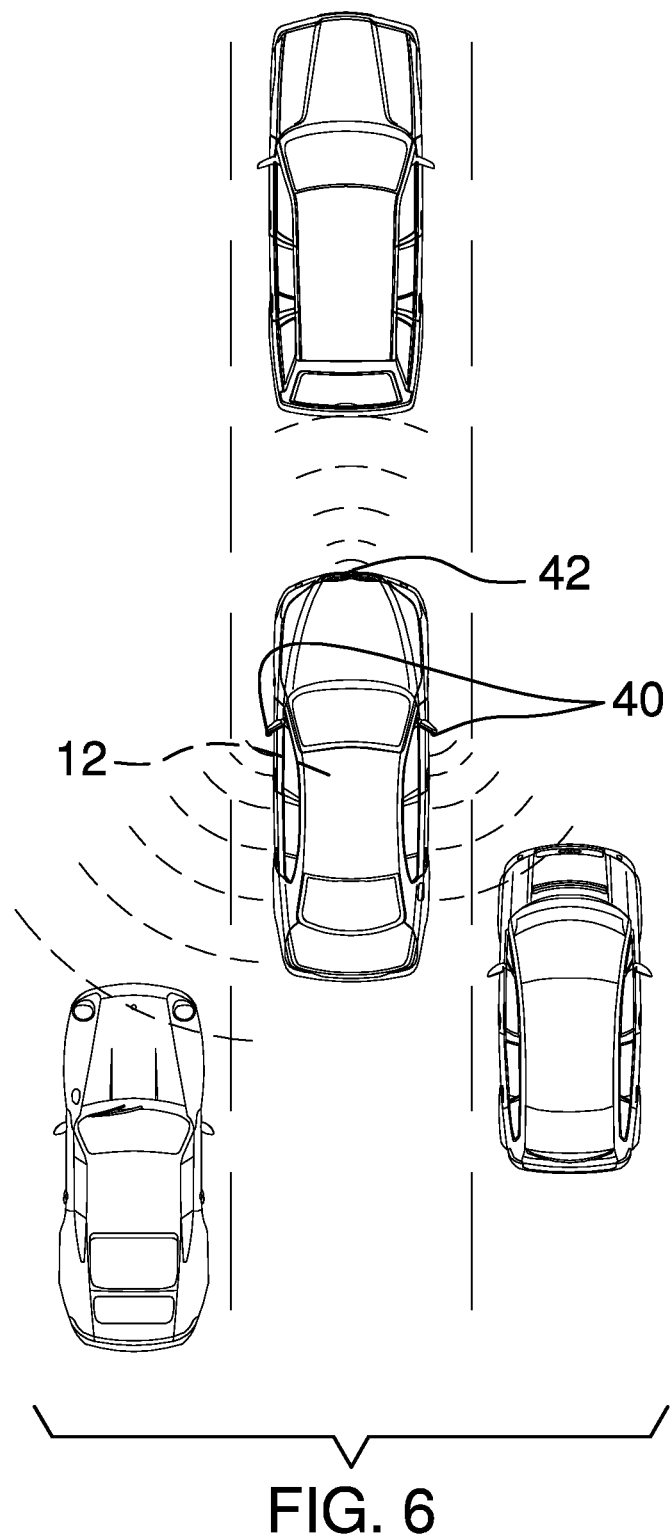
FIG. 6 is an in-use view of an embodiment of the disclosure.

With reference now to the drawings, and in particular to FIGS. 1 through 6 thereof, a new avoidance assembly embodying the principles and concepts of an embodiment of the disclosure and generally designated by the reference numeral 10 will be described.

As best illustrated in FIGS. 1 through 6, the collision avoidance assembly 10 generally comprises a controller 12 and a plurality of sensors 14. The controller 12 is configured to communicate wirelessly. The controller 12 also is configured to couple to a wrist of a driver of a first vehicle. The controller 12 also is configured to selectively vibrate to alert the driver.

In one embodiment, the controller 12 comprises a housing 16 that defines an interior space 18. A band 20 is coupled to and extends between opposing ends 22 of the housing 16 to define a loop 24. The loop 24 is configured to insert a hand of the driver to couple the housing 16 to the wrist of the driver. At least one battery 26, a microprocessor 28, a receiver 30, and a vibrator 32 are coupled to the housing 16 and are positioned in the interior space 18. The at least one battery 26 is rechargeable. The microprocessor 28 is operationally coupled to the at least one battery 26. The receiver 30 and the vibrator 32 are operationally coupled to the microprocessor 28. The microprocessor 28 is positioned to compel the vibrator 32 to vibrate to alert the driver.

A connector 34 is positioned in a back 36 of the housing 16. The connector 34 is operationally coupled to the at least one battery 26. The connector 34 is configured to couple the at least one battery 26 to a source of direct current to recharge the at least one battery 26. In one embodiment, the connector 34 comprises a Universal Serial Bus port 38.

The plurality of sensors 14 is configured to couple to the first vehicle. The sensors 14 are operationally coupled to the controller 12. The sensors 14 are configured to selectively detect an object, such as a second vehicle and debris, proximate to the first vehicle and to communicate a warning to the controller 12. The controller 12 is configured to vibrate to alert the driver to the object proximate to the first vehicle.

In one embodiment, the sensors 14 are operationally coupled to a speedometer of the first vehicle. The sensors 14 are selectively operable above a selected speed of the first vehicle. In another embodiment, the sensors 14 are operationally coupled to a brake system of the first vehicle. The sensors 14 are selectively inoperable when the brake system of the first vehicle is engaged.

In yet another embodiment, the plurality of sensors 14 comprises a pair of first detectors 40 and a second detector 42. The first detectors 40 are positioned singly on opposing sides of the first vehicle. The second detector 42 is positioned on a front of the first vehicle. The first detectors 40 are configured to detect the object proximate to the opposing sides and to communicate the warning to the controller 12. The controller 12 is configured to vibrate to alert the driver to the object proximate to the opposing sides of the first vehicle prior to the driver of the first vehicle effecting a course alteration, such as a lane change. The driver is positioned to avoid a side collision. In yet another embodiment, each first detector 40 is operationally coupled to an associated turn signal of the first vehicle. The first detector 40 is selectively operable coincident with the associated turn signal.

The second detector 42 is configured to detect the object proximate to the front of the first vehicle, as the first vehicle approaches the object proximate to the front of the first vehicle, and to communicate the warning to the controller 12. The controller 12 is configured to vibrate to alert the driver to the object proximate to the front of the first vehicle. The driver is positioned to avoid a frontal collision.

Each of a plurality of transmitters 44 is operationally coupled to a respective sensor 14. Each transmitter 44 is positioned to communicate a respective warning to the receiver 30 to relay to the microprocessor 28.

Each of a plurality of wires 46 is operationally coupled to a respective sensor. The wires 46 are configured to couple to an electrical circuit of the first vehicle to power the sensors 14.

A first button 48 is coupled to the housing 16. The first button 48 is depressible. The first button 48 is operationally coupled to the at least one battery 26 and the microprocessor 28. The first button 48 is configured to be depressed a first time to operationally couple the microprocessor 28 to the at least one battery 26 and to be depressed a second time to decouple the microprocessor 28 from the at least one battery 26.

A second button 50 is coupled to the housing 16. The second button 50 is depressible. The second button 50 is operationally coupled to the microprocessor 28. The second button 50 is configured to be depressed to compel the microprocessor 28 to lower a distance threshold for the plurality of sensors 14.

A third button 52 is coupled to the housing 16. The third button 52 is depressible. The third button 52 is operationally coupled to the microprocessor 28. The third button 52 is configured to be depressed to compel the microprocessor 28 to increase the distance threshold for the plurality of sensors 14.

A display 54 is coupled to an upper face 56 of the housing 16. The display 54 is operationally coupled to the microprocessor 28. The microprocessor 28 is positioned to compel the display 54 to present the distance threshold for the plurality of sensors 14.

In one embodiment of the invention, the housing 16 is substantially rectangularly box shaped and a coupler 58 is coupled to a lower face 60 of the housing 16. The coupler 58 is configured to couple the housing 16 to an interior surface of the first vehicle, such as a dashboard. In another embodiment, the coupler 58 comprises a cup 62. The cup 62 is resilient. The cup 62 is configured to be depressed between the housing 16 and the interior surface to suctionally couple the housing 16 to the first vehicle.

In use, the loop 24 is configured to insert the hand of the driver to couple the housing 16 to the wrist of the driver. The second button 50 that is positioned on the housing 16 is configured to be depressed to compel the microprocessor 28 to lower the distance threshold for the plurality of sensors 14. The third button 52 that is positioned on the housing 16 is configured to be depressed to compel the microprocessor 28 to increase the distance threshold for the plurality of sensors 14.

The first detectors 40 that are positioned on the opposing sides of the first vehicle are configured to detect the object proximate to the opposing sides. Each transmitter 44 is positioned to communicate the respective warning to the receiver 30 to relay to the microprocessor 28. The microprocessor 28 is positioned to compel the vibrator 32 to vibrate to alert the driver to the object proximate to the opposing sides of the first vehicle prior to the driver of the first vehicle effecting the course alteration, such as the lane change. The driver is positioned to avoid the side collision.

The second detector 42 that is positioned on the front of the first vehicle is configured to detect the object proximate to the front of the first vehicle as the first vehicle approaches the object proximate to the front of the first vehicle. The respective transmitter 44 is positioned to communicate the respective warning to the receiver 30 to relay to the microprocessor 28. The microprocessor 28 is positioned to compel the vibrator 32 to vibrate to alert the driver to the object proximate to the front of the first vehicle. The driver is positioned to avoid the frontal collision.

The Universal Serial Bus port 38 that is positioned in the housing 16 is configured to couple the at least one battery 26 to the source of direct current to recharge the at least one battery 26.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A collision avoidance assembly comprising:
   a controller, said controller being configured for communicating wirelessly, said controller being configured for coupling to a wrist of a driver of a first vehicle, said controller being configured for selectively vibrating for alerting the driver;
   a plurality of sensors configured for coupling to the first vehicle, said sensors being operationally coupled to said controller, said sensors being configured for selectively detecting an object proximate to the first vehicle and for communicating a warning to said controller; and wherein said sensors are positioned on the first vehicle such that said sensors are configured for detecting the object proximate to the first vehicle and for communicating the warning to said controller such that said controller is configured for vibrating for alerting the driver to the object proximate to the first vehicle;

said controller comprising
  a housing defining an interior space;
  a band coupled to and extending between opposing ends of said housing defining a loop;
  at least one battery coupled to said housing and positioned in said interior space;
  a microprocessor coupled to said housing and positioned in said interior space, said microprocessor being operationally coupled to said at least one battery;
  a receiver coupled to said housing and positioned in said interior space, said receiver being operationally coupled to said microprocessor;
  a vibrator coupled to said housing and positioned in said interior space, said vibrator being operationally coupled to said microprocessor; and
  wherein said band is positioned on said housing such that said loop is configured for inserting a hand of the driver for coupling said housing to the wrist of the driver, wherein said microprocessor is positioned in said housing such that said microprocessor is positioned for compelling said vibrator for vibrating for alerting the driver;
a first button coupled to said housing, said first button being depressible, said first button being operationally coupled to said at least one battery and said microprocessor;
a second button coupled to said housing, said second button being depressible, said second button being operationally coupled to said microprocessor;
a third button coupled to said housing, said third button being depressible, said third button being operationally coupled to said microprocessor; and
wherein said second button is positioned on said housing such that said second button is configured for depressing for compelling said microprocessor for lowering a distance threshold for said plurality of sensors, wherein said third button is positioned on said housing such that said third button is configured for depressing for compelling said microprocessor for increasing the distance threshold for said plurality of sensors.

2. The assembly of claim 1, further comprising:
said at least one battery being rechargeable;
a connector positioned in a back of said housing, said connector being operationally coupled to said at least one battery; and
wherein said connector is positioned in said housing such that said connector is configured for coupling said at least one battery to a source of direct current for recharging said at least one battery.

3. The assembly of claim 2, further including said connector comprising a Universal Serial Bus port.

4. The assembly of claim 1, further including said sensors being operationally coupled to a speedometer of the first vehicle such that said sensors are selectively operable above a selected speed of the first vehicle.

5. The assembly of claim 1, further including said sensors being operationally coupled to a brake system of the first vehicle such that said sensors are selectively inoperable when the brake system of the first vehicle is engaged.

6. The assembly of claim 1, further including said plurality of sensors comprising:
  a pair of first detectors, said first detectors being positioned singly on opposing sides of the first vehicle;
  a second detector, said second detector being positioned on a front of the first vehicle; and
  wherein said first detectors are positioned on the opposing sides of the first vehicle such that said first detectors are configured for detecting the object proximate to the opposing sides and for communicating the warning to said controller such that said controller is configured for vibrating for alerting the driver to the object proximate to the opposing sides of the first vehicle prior to the driver of the first vehicle effecting a course alteration such that the driver is positioned for avoiding a side collision, wherein said second detector is positioned on the front of the first vehicle such that said second detector is configured for detecting the object proximate to the front of the first vehicle as the first vehicle approaches the object proximate to the front of the first vehicle and for communicating the warning to said controller such that said controller is configured for vibrating for alerting the driver to the object proximate to the front of the first vehicle such that the driver is positioned for avoiding a frontal collision.

7. The assembly of claim 6, further including each said first detector being operationally coupled to an associated turn signal of the first vehicle such that said first detector is selectively operable coincident with the associated turn signal.

8. The assembly of claim 1, further including a plurality of transmitters, each said transmitter being operationally coupled to a respective said sensor, wherein said transmitters are positioned on said sensors such that each said transmitter is positioned for communicating a respective warning to said receiver for relaying to said microprocessor.

9. The assembly of claim 1, further including a plurality of wires, each said wire being operationally coupled to a respective said sensor, said wires being configured for coupling to an electrical circuit of the first vehicle, wherein said wires are positioned on said sensors such that said wires are configured for coupling to the electrical circuit of the first vehicle for powering said sensors.

10. The assembly of claim 1, further including said first button being positioned on said housing such that said first button is configured for depressing a first time for operationally coupling said microprocessor to said at least one battery and for depressing a second time for decoupling said microprocessor from said at least one battery.

11. The assembly of claim 1, further including a display coupled to an upper face of said housing, said display being operationally coupled to said microprocessor, wherein said display is positioned on said housing such that said microprocessor is positioned for compelling said display for presenting the distance threshold for said plurality of sensors.

12. The assembly of 1, further comprising:
  said housing being substantially rectangularly box shaped;
  a coupler coupled to a lower face of said housing, said coupler being configured for coupling said housing to an interior surface of the first vehicle; and wherein said coupler is positioned on said housing such that said coupler is configured for coupling said housing to the first vehicle.

13. The assembly of claim 12, further including said coupler comprising a cup, said cup being resilient such that said cup is configured for depressing between said housing and the interior surface for suctionally coupling said housing to the first vehicle.

14. A collision avoidance assembly comprising:
a controller, said controller being configured for communicating wirelessly, said controller being configured for coupling to a wrist of a driver of a first vehicle, said controller being configured for selectively vibrating for alerting the driver, said controller comprising:
   a housing defining an interior space,
   a band coupled to and extending between opposing ends of said housing defining a loop, wherein said band is positioned on said housing such that said loop is configured for inserting a hand of the driver for coupling said housing to the wrist of the driver,
   at least one battery coupled to said housing and positioned in said interior space, said at least one battery being rechargeable,
   a microprocessor coupled to said housing and positioned in said interior space, said microprocessor being operationally coupled to said at least one battery,
   a receiver coupled to said housing and positioned in said interior space, said receiver being operationally coupled to said microprocessor,
   a vibrator coupled to said housing and positioned in said interior space, said vibrator being operationally coupled to said microprocessor, wherein said microprocessor is positioned in said housing such that said microprocessor is positioned for compelling said vibrator for vibrating for alerting the driver, and
   a connector positioned in a back of said housing, said connector being operationally coupled to said at least one battery, wherein said connector is positioned in said housing such that said connector is configured for coupling said at least one battery to a source of direct current for recharging said at least one battery, said connector comprising a Universal Serial Bus port;
a plurality of sensors configured for coupling to the first vehicle, said sensors being operationally coupled to said controller, said sensors being configured for selectively detecting an object proximate to the first vehicle and for communicating a warning to said controller, wherein said sensors are positioned on the first vehicle such that said sensors are configured for detecting the object proximate to the first vehicle and for communicating the warning to said controller such that said controller is configured for vibrating for alerting the driver to the object proximate to the first vehicle, said sensors being operationally coupled to a speedometer of the first vehicle such that said sensors are selectively operable above a selected speed of the first vehicle, said sensors being operationally coupled to a brake system of the first vehicle such that said sensors are selectively inoperable when the brake system of the first vehicle is engaged, said plurality of sensors comprising a pair of first detectors and a second detector, said first detectors being positioned singly on opposing sides of the first vehicle, said second detector being positioned on a front of the first vehicle, wherein said first detectors are positioned on the opposing sides of the first vehicle such that said first detectors are configured for detecting the object proximate to the opposing sides and for communicating the warning to said controller such that said controller is configured for vibrating for alerting the driver to the object proximate to the opposing sides of the first vehicle prior to the driver of the first vehicle effecting a course alteration such that the driver is positioned for avoiding a side collision, each said first detector being operationally coupled to an associated turn signal of the first vehicle such that said first detector is selectively operable coincident with the associated turn signal, wherein said second detector is positioned on the front of the first vehicle such that said second detector is configured for detecting the object proximate to the front of the first vehicle as the first vehicle approaches the object proximate to the front of the first vehicle and for communicating the warning to said controller such that said controller is configured for vibrating for alerting the driver to the object proximate to the front of the first vehicle such that the driver is positioned for avoiding a frontal collision;
a plurality of transmitters, each said transmitter being operationally coupled to a respective said sensor, wherein said transmitters are positioned on sensors such that each said transmitter is positioned for communicating a respective warning to said receiver for relaying to said microprocessor;
a plurality of wires, each said wire being operationally coupled to a respective said sensor, said wires being configured for coupling to an electrical circuit of the first vehicle, wherein said wires are positioned on said sensors such that said wires are configured for coupling to the electrical circuit of the first vehicle for powering said sensors;
a first button coupled to said housing, said first button being depressible, said first button being operationally coupled to said at least one battery and said microprocessor, wherein said first button is positioned on said housing such that said first button is configured for depressing a first time for operationally coupling said microprocessor to said at least one battery and for depressing a second time for decoupling said microprocessor from said at least one battery;
a second button coupled to said housing, said second button being depressible, said second button being operationally coupled to said microprocessor, wherein said second button is positioned on said housing such that said second button is configured for depressing for compelling said microprocessor for lowering a distance threshold for said plurality of sensors;
a third button coupled to said housing, said third button being depressible, said third button being operationally coupled to said microprocessor, wherein said third button is positioned on said housing such that said third button is configured for depressing for compelling said microprocessor for increasing the distance threshold for said plurality of sensors;
a display coupled to an upper face of said housing, said display being operationally coupled to said microprocessor, wherein said display is positioned on said housing such that said microprocessor is positioned for compelling said display for presenting the distance threshold for said plurality of sensors; and
wherein said band is positioned on said housing such that said loop is configured for inserting the hand of the driver for coupling said housing to the wrist of the driver, wherein said second button is positioned on said housing such that said second button is configured for depressing for compelling said microprocessor for lowering the distance threshold for said plurality of sensors, wherein said third button is positioned on said housing such that said third button is configured for depressing for compelling said microprocessor for increasing the distance threshold for said plurality of sensors, wherein said first detectors are positioned on the opposing sides of the first vehicle such that said first detectors are configured for detecting the object proximate to the opposing sides, wherein said transmitters are positioned on said first detectors such that each said transmitter is positioned for communicating the respective warning to said receiver for relaying to said microprocessor such that said microprocessor is positioned for compelling said vibrator for vibrating for alerting the driver to the object proximate to the opposing sides of the first vehicle prior to the driver of the first vehicle effecting the course alteration such that the driver is positioned for avoiding the side collision, wherein said second detector is positioned on the front of the first vehicle such that said second detector is configured for detecting the object proximate to the front of the first vehicle as the first vehicle approaches the object proximate to the front of the first vehicle, wherein a respective said transmitter is positioned on said second detector such that said respective said transmitter is positioned for communicating the respective warning to said receiver for relaying to said microprocessor such that said microprocessor is positioned for compelling said vibrator for vibrating for alerting the driver to the object proximate to the front of the first vehicle such that the driver is positioned for avoiding the frontal collision, wherein said Universal Serial Bus port is positioned in said housing such that said Universal Serial Bus port is configured for coupling said at least one battery to the source of direct current for recharging said at least one battery.

15. The assembly of 14, further comprising:

said housing being substantially rectangularly box shaped;

a coupler coupled to a lower face of said housing, said coupler being configured for coupling said housing to an interior surface of the first vehicle said coupler comprising a cup, said cup being resilient such that said cup is configured for depressing between said housing and the interior surface for suctionally coupling said housing to the first vehicle; and wherein said coupler is positioned on said housing such that said coupler is configured for coupling said housing to the first vehicle.

\* \* \* \* \*